United States Patent
Steckling et al.

(10) Patent No.: US 11,045,777 B2
(45) Date of Patent: Jun. 29, 2021

(54) ADJUSTABLE VENTURI

(71) Applicant: ClearWater Tech, LLC, San Luis Obispo, CA (US)

(72) Inventors: Philip J. Steckling, San Luis Obispo, CA (US); Cameron Tapp, San Luis Obispo, CA (US)

(73) Assignee: ClearWater Tech, LLC, San Luis Obispo, CA (US)

( * ) Notice: Subject to any disclaimer, the term of this patent is extended or adjusted under 35 U.S.C. 154(b) by 0 days.

(21) Appl. No.: 16/127,311

(22) Filed: Sep. 11, 2018

(65) Prior Publication Data

US 2019/0076799 A1    Mar. 14, 2019

Related U.S. Application Data

(60) Provisional application No. 62/556,937, filed on Sep. 11, 2017.

(51) Int. Cl.
*B01F 5/04* (2006.01)
*B01F 15/00* (2006.01)
*G05D 11/13* (2006.01)

(52) U.S. Cl.
CPC ............ *B01F 5/0428* (2013.01); *B01F 5/045* (2013.01); *B01F 5/0496* (2013.01);
(Continued)

(58) Field of Classification Search
CPC ..... Y10T 137/87619; Y10T 137/87627; Y10T 137/87635; Y10T 137/2499; B01F 5/0428;
(Continued)

(56) References Cited

U.S. PATENT DOCUMENTS

| | | | |
|---|---|---|---|
| 2,360,733 A * | 10/1944 | Smith | F16K 3/243 251/324 |
| 2,683,622 A * | 7/1954 | Dragon | A01C 23/042 422/276 |

(Continued)

FOREIGN PATENT DOCUMENTS

| | | |
|---|---|---|
| CN | 100564893 C | 12/2009 |
| CN | 203575464 U | 5/2014 |

(Continued)

*Primary Examiner* — Kevin F Murphy
(74) *Attorney, Agent, or Firm* — Husch Blackwell LLP (57) ABSTRACT

Adjustable venturi assemblies and methods of using adjustable venturi assemblies are disclosed. In one aspect, a venturi assembly for injecting a secondary fluid into a primary fluid flow path is provided. The venturi assembly comprises a nozzle, a constricted section in fluid communication with the nozzle, a secondary fluid conduit in fluid communication with the nozzle, and a flow adjusting device. The nozzle and constricted section together define the primary fluid flow path along a first axis. The secondary fluid conduit is for transporting secondary fluid from the secondary fluid reservoir to the constricted section along a second axis. The flow adjusting device is positioned opposite the secondary fluid conduit and is configured to alter a velocity of fluid flowing along the primary fluid flow path by extending into a portion of the constricted section along the second axis.

20 Claims, 4 Drawing Sheets

(52) U.S. Cl.
CPC ...... *B01F 15/00344* (2013.01); *G05D 11/132* (2013.01); *B01F 2005/044* (2013.01); *B01F 2005/0435* (2013.01); *Y10T 137/2499* (2015.04); *Y10T 137/87619* (2015.04); *Y10T 137/87627* (2015.04)

(58) Field of Classification Search
CPC ....... B01F 2005/044; B01F 2005/0435; G05D 11/131; G05D 11/132; G05D 11/133
USPC ........................................................ 251/324
See application file for complete search history.

(56) References Cited

U.S. PATENT DOCUMENTS

| | | | | |
|---|---|---|---|---|
| 2,881,800 | A * | 4/1959 | Bauerlein | F16K 27/0263 |
| | | | | 137/892 |
| 3,011,443 | A | 12/1961 | Nielsen | |
| 3,618,263 | A * | 11/1971 | Weijsenburg | B24C 7/0053 |
| | | | | 451/90 |
| 3,638,679 | A * | 2/1972 | Gorchev | F24F 13/26 |
| | | | | 137/895 |
| 3,722,523 | A | 3/1973 | Kawabata | |
| 4,471,907 | A | 9/1984 | Gerstmann | |
| 5,207,148 | A * | 5/1993 | Anderson | A47J 31/36 |
| | | | | 137/893 |
| 5,411,100 | A * | 5/1995 | Laskaris | A62C 5/02 |
| | | | | 169/14 |
| 5,622,203 | A | 4/1997 | Givler | |
| 6,149,824 | A | 11/2000 | Chace | |
| 7,416,326 | B2 * | 8/2008 | Sakata | A61L 2/18 |
| | | | | 137/889 |
| 7,543,600 | B2 * | 6/2009 | Berggren | F02D 9/12 |
| | | | | 123/568.17 |
| 7,722,132 | B2 | 5/2010 | Carlsson | |

FOREIGN PATENT DOCUMENTS

| | | |
|---|---|---|
| KR | 101405879 B1 | 6/2014 |
| TW | M378034 U | 4/2010 |

* cited by examiner

ADJUSTABLE VENTURI

CROSS-REFERENCES TO RELATED APPLICATIONS

The present application claims priority to U.S. Provisional Patent Application No. 62/556,937, filed Sep. 11, 2017, entitled "Adjustable Venturi," which is hereby incorporated by reference in its entirety.

STATEMENT REGARDING FEDERALLY SPONSORED RESEARCH

Not Applicable.

BACKGROUND OF THE INVENTION

1. Field of the Invention

The disclosure relates to an adjustable venturi that can inject a second fluid into a main flow path of a first fluid traveling through the venturi assembly.

2. Description of the Related Art

Venturi valves are used in a number of different fluid transportation devices, and have proven to be useful in regulating flow or measuring characteristics of an incompressible fluid. Venturi valves rely upon the principle of mass continuity by providing a nozzle, a constricted flow area, and a diffuser section. As fluid passes from the nozzle to the constricted flow area, the velocity of the fluid increases. The gain in the kinetic energy of the fluid is offset by a corresponding drop in the pressure of the fluid. Accordingly, a low pressure area is formed at the constricted area of the venturi valve.

The low pressure zone in the constricted area of the venturi valve can also enable the injection of additional fluids into the fluid flow path. Fluid reservoirs can be placed in communication with low pressure zones in the main fluid flow path, which can provide a secondary fluid into the main fluid flow path. If the low pressure zone experiences a pressure less than the pressure in the fluid reservoir, the pressure differential between the two areas may drive flow from the reservoir into the main flow path, thereby injecting the secondary fluid into the main fluid flow path.

Venturi injectors available on the market today are static, and provide for flows and pressure drops that are predetermined by the sizing of the components. The static nature of conventional injectors makes it difficult to account for any changes in the system or any variance in flow once the venturi injector has been installed. As such, the venturi injector's ability to inject the proper amount of secondary fluid into the main fluid flow path may be negatively impacted or compromised.

Accordingly, a need exists for a venturi injector that can be adjusted after installation to accommodate for different injection needs and variable flow characteristics.

SUMMARY OF THE INVENTION

The present invention provides an adjustable venturi assembly for mixing and dispersing a fluid mixture.

In one aspect, a venturi assembly for injecting a secondary fluid into a primary fluid flow path is provided. The venturi assembly comprises a nozzle, a constricted section in fluid communication with the nozzle, a secondary fluid conduit in fluid communication with the constricted section, and a flow adjusting device. The nozzle and constricted section together define the primary fluid flow path along a first axis. The secondary fluid conduit transports secondary fluid from the secondary fluid reservoir to the constricted section along a second axis. The flow adjusting device is positioned opposite the secondary fluid conduit and is configured to alter a velocity of fluid flowing along the primary fluid flow path by extending into a portion of the constricted section along the second axis.

These and other features, aspects, and advantages of the present invention will become better understood upon consideration of the following detailed description, drawings and appended claims.

BRIEF DESCRIPTION OF THE DRAWINGS

Like reference numerals will be used to refer to like parts from Figure to Figure in the following description of the drawings. Although the drawings represent embodiments of the present disclosure, the drawings are not necessarily to scale and certain features may be exaggerated in order to better illustrate and explain the embodiments of the present disclosure.

DETAILED DESCRIPTION OF THE INVENTION

Before the present systems and methods are described, it is to be understood that the terminology used herein is for the purpose of describing particular embodiments only, and is not intended to limit the scope of the present invention.

It must be noted that as used herein and in the appended claims, the singular forms "a", "an", and "the" include plural references unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. It should be understood that the terms "throat," "choked section," and "constricted section" are interchangeable for purposes of this invention.

Figure 1A:
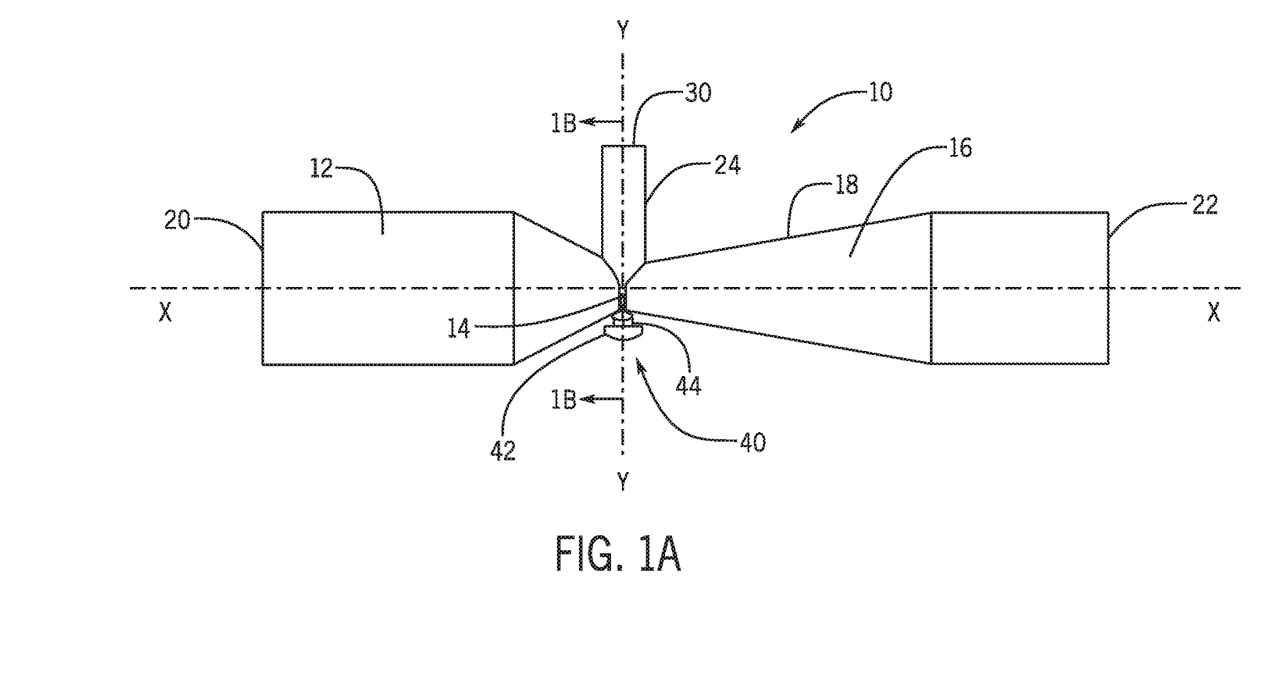
FIG. 1A is a front view of a venturi assembly according to embodiments of the disclosure.
Figure 1B:
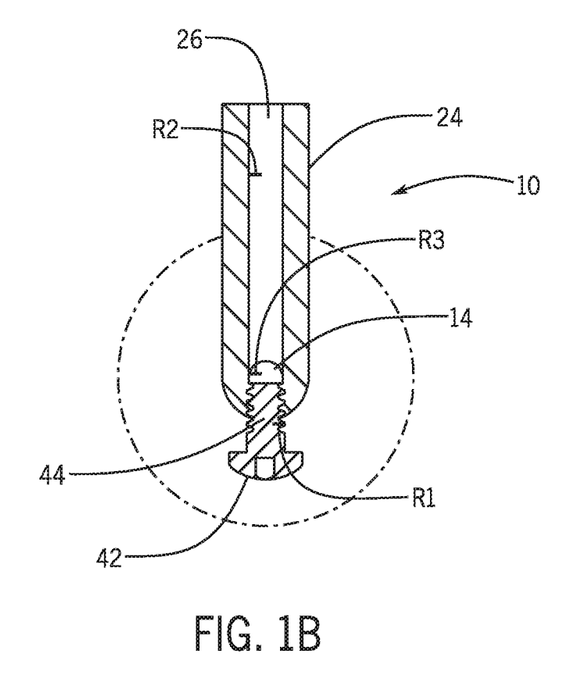
FIG. 1B is a cross-sectional view of the venturi assembly of FIG. 1A taken along line 1B-1B of FIG. 1A.

Referring now to FIGS. 1A and 1B, a venturi assembly 10 is disclosed. As illustrated, the venturi assembly 10 includes a nozzle 12, a throat 14, and a diffuser 16, each of which are placed in fluid communication with one another. In some embodiments, the nozzle 12, the throat 14, and the diffuser 16 define a primary fluid flow path along a first axis. For example, the primary fluid flow path may be generally formed along or parallel to an axis X-X.

The nozzle 12 is defined by a tapered section, which decreases in cross-sectional area as it approaches the throat 14 along the axis X-X. When primary fluid is inputted into the nozzle 12, the decreasing cross-sectional area causes the primary fluid to increase in velocity. To account for the increase in kinetic energy of the fluid, the static pressure of the primary fluid decreases. The nozzle 12 decreases in cross-sectional area until it reaches the throat 14, where primary fluid reaches a local maximum velocity as it passes through the constricted section 14. In some embodiments, the throat 14 may have a constant cross-sectional area throughout as it extends axially between the nozzle 12 and the diffuser 16. The throat 14 may be defined by radius R3.

After the primary fluid passes through the throat 14, the primary fluid can exit the venturi assembly 10 through a diffuser 16. In contrast to the nozzle 12, the diffuser 16 is defined by a tapered section that enlarges in cross-sectional area as it extends away from the throat 14 along the axis X-X. In some embodiments, the rate at which the diffuser 16 enlarges in cross-sectional area as it extends axially away from the throat 14 is less than the rate in which the nozzle decreases in cross-sectional area as it axially approaches the throat 14. As fluid exits the throat 14 and enters the diffuser 16, the increased cross-sectional area of the diffuser 16 causes the velocity of the primary fluid to decrease, while the static pressure of the primary fluid increases. In some embodiments, the increased cross-sectional area provided by the diffuser 16 may create low pressure zones in the primary fluid flow path that may promote further mixing of secondary fluid with primary fluid passing through the diffuser 16, as will be explained in more detail below.

In some embodiments, the nozzle 12, the throat 14, and the diffuser 16 are enclosed by an outer surface 18, which may take the form of conical and cylindrical sections. The outer surface 18 can be formed with one or more coupling sections 20, 22, which allow the venturi assembly 10 to be placed in fluid communication with an inlet source or an outlet section. In some embodiments, the venturi assembly 10 is provided with a threaded inlet connection 20 and a threaded outlet connection 22. The threaded inlet connection 20 and threaded outlet connection 22 can be threaded into pipes or other threaded connections, for example. In some embodiments, the threaded inlet connection 20 and the threaded outlet connection 22 are configured to receive hoses (not shown) that may further define the primary fluid flow path. Further, in some embodiments, only an inlet coupling section 20 is provided. In such embodiments, fluid may exit the venturi assembly 10 out of the diffuser 16, where it can be introduced to an external environment. In still other embodiments, the venturi assembly 10 may omit a diffuser 16 altogether, so that fluid may exit the venturi assembly 10 out of the throat 14 at a high velocity and low static pressure.

In some embodiments, venturi assembly 10 includes a secondary fluid inlet 24, which can be configured to inject secondary fluid into the primary fluid flow path. In some embodiments, the secondary fluid inlet 24 has a conduit 26 that is configured to place the throat 14 in fluid communication with a secondary fluid source, such as a secondary fluid reservoir (e.g., reservoir 128 in FIG. 2). In some embodiments, the conduit 26 is placed within the throat 14 so that the low static pressure of the primary fluid flowing through the throat 14 creates a large enough pressure differential between the throat 14 and the secondary fluid reservoir to draw secondary fluid from the secondary fluid reservoir, through the conduit 26, and towards the low pressure zone in the throat 14. If the pressure differential between the throat 14 and the fluid reservoir is large enough, secondary fluid will join the primary fluid flow path, which causes the secondary fluid to then mix with the primary fluid.

The conduit 26 may be provided with a number of different exterior and interior shapes, and may extend radially away from the throat 14. For example, the external shape of the conduit 26 may include a secondary fluid source connection 30, which provides a threaded surface to connect to a secondary fluid source. In some embodiments, the conduit 26 is integrally formed within the secondary fluid inlet 24, and provides a cylindrical internal passage between the throat 14 and the secondary fluid source. For example, the internal passage of the conduit 26 may be defined by radius R2. Additionally, the conduit 26 may be axially aligned (e.g., centered) along a secondary axis Y-Y. In some embodiments, the secondary axis Y-Y is chosen to be substantially perpendicular to the primary axis X-X, and may partially define a secondary flow path.

The venturi assembly 10 also includes a flow adjusting device 40 for altering flow along the primary flow path and the secondary flow path. To alter flow along the primary flow path, the flow adjusting device 40 may extend into a portion of the throat 14, thereby reducing the cross-sectional area through which primary fluid can flow along the primary fluid flow path. As fluid enters the reduced cross-sectional area, the fluid increases in velocity and decreases in static pressure. Flow along the secondary flow path may also be altered by the flow adjusting device 40, as flow adjusting device 40 may be positioned within the secondary flow path. When secondary fluid flows along the secondary flow path, the shape of flow adjusting device 40 may direct secondary fluid outwardly away from the secondary flow path, such that secondary fluid is dispersed within the primary fluid flow path, which promotes mixing.

In other embodiments, the flow adjusting device 40 may instead be positioned outside the throat 14, and may be configured to translate axially along axis Y-Y. The throat 14 may comprise a flexible material, which allows the flow adjusting device 40 to collapse the cross section of throat 14 as it translates axially along axis Y-Y inward toward the throat 14. This may allow primary fluid to achieve an even higher velocity (and lower static pressure), as it may remove sharp corners and flow slowing obstacles from the primary fluid flow path.

In some embodiments, the flow adjusting device 40 is positioned opposite the conduit 26, relative to the throat 14. This configuration may allow secondary fluid to be drawn into the throat 14 at variable rates, depending on the positioning of the flow adjusting device 40. In embodiments such as those shown in the figures, the flow adjusting device 40 and conduit 26 may lie along the same axis Y-Y.

The flow adjusting device 40 may be defined by a number of different shapes and sizes that enable it to reduce the area of the throat 14 within the venturi assembly 10. In some embodiments, the flow adjusting device 40 is configured to move axially into and out of the throat 14 along the axis Y-Y. As flow adjusting device 40 moves axially into the throat 14, the cross-sectional area of the primary fluid flow path decreases, thereby increasing the velocity of the primary fluid flowing along the primary fluid flow path. The increase in velocity of the primary fluid causes a corresponding decrease in fluid static pressure, which creates an even higher pressure differential between the secondary fluid source and the throat 14. The higher pressure differential causes a greater amount of secondary fluid to be drawn from the secondary fluid source through conduit 26 and into the throat 14, where it can then join the primary fluid flow path and mix with the primary fluid.

In one non-limiting example, the flow adjusting device 40 may be a fastener. The fastener 40 can be threadably engaged to a portion of the outer surface 18 that surrounds the nozzle 12, the throat 14, and the diffuser 16. In embodiments where the flow adjusting device 40 is a fastener, the flow adjusting device 40 may comprise a head 42 and a cylindrical section 44. The cylindrical section 44 can include threads that enable threaded rotation relative to a threaded hole extending through the outer surface 18. In a flow adjusting device 40 with right-handed threads, clockwise motion causes the cylindrical section 44 of the flow adjusting device 40 to translate axially into the throat 14, where it can reduce the cross-sectional area of the primary flow path to increase fluid velocity through the section. To produce such angular motion, the head 42 may be provided with a Phillips head, hex-head, flat-head, Robertson head, or other type of geometry. The head 42 can be readily engaged by a screwdriver, hex key, or other device that enables engagement between the tool and head 42 sufficient to effect rotation of the flow adjusting device 40. In some embodiments, the cylindrical section 44 is sized to extend entirely across the throat 14, where it may then enter or contact the conduit 26.

The cylindrical section 44 of the flow adjusting device 40 may be defined by a radius R1. In some embodiments, the radius R1 is chosen to be smaller than the radius R2 that defines the conduit 26 and smaller than the radius R3, which defines the throat 14. In some embodiments, the radius R1 and the radius R2 are substantially concentric with one another about the axis Y-Y. In such embodiments, the cylindrical section 44 can be configured to extend entirely across the throat 14 and into the conduit 26. With the radius R1 being smaller than the radius R2, the cylindrical section 44 of the flow adjusting device 40 can serve to reduce the cross-sectional area along the secondary flow path, which may increase the velocity of secondary fluid flowing from secondary fluid source into the conduit 26 and into the throat 14. In other embodiments, the radius R1 can be chosen to be larger than the radius R2. The cylindrical section 44 of the flow adjusting device 40 can then be configured to extend entirely across throat 14 and engage the conduit 26, which may serve as a seal to at least partially restrict the flow of secondary fluid from the conduit 26 into the throat 14. In some embodiments, the radius R1 defining the cylindrical section 44 of the flow adjusting device 40 can be smaller than the radius R3. In such embodiments, the cylindrical section 44 provides a frontal area perpendicular to the primary flow path that is less than the cross-sectional area of the throat 14. In such embodiments, the primary flow path is not blocked entirely when the cylindrical section 44 extends entirely across the throat 14. However, it should be appreciated that in certain embodiments, the cylindrical section 44 may be defined a radius R1 larger than the radius R3, such that the flow adjusting device 40 can serve as a complete shut off valve for the venturi assembly 10, and can restrict the flow of primary fluid along the primary fluid flow path when the cylindrical section 44 extends entirely across the throat 14.

Figure 2:
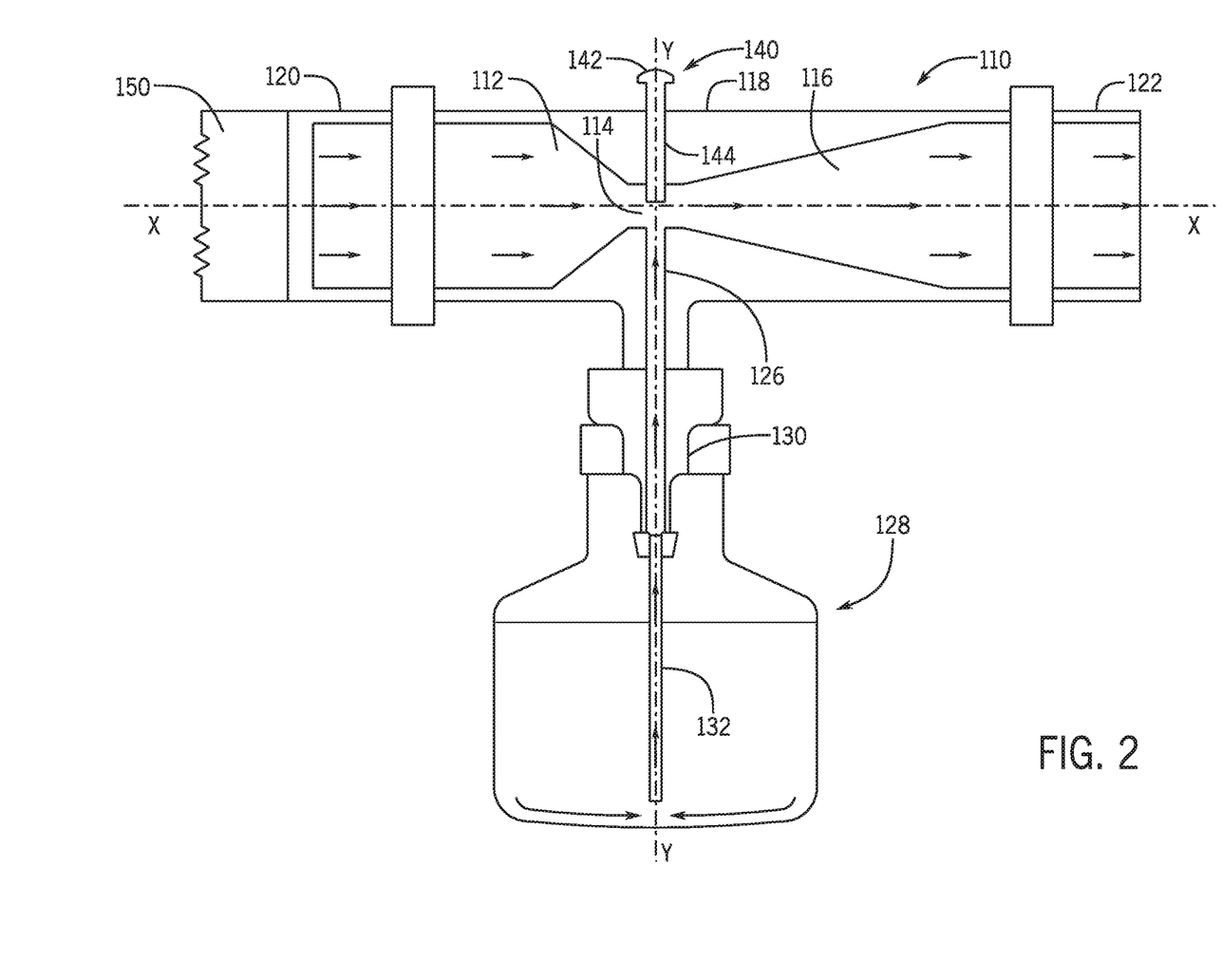
FIG. 2 is a cross-sectional view of an alternative embodiment of a venturi assembly where the front half of the venturi assembly is removed to show internal components.

Referring now to FIG. 2, a second embodiment of a venturi assembly 110 is shown connected to primary and secondary fluid sources 128, 150. In the illustrative embodiment, a threaded inlet connection 120 is placed in communication with a hose 150, which may be configured to introduce primary fluid into the primary fluid flow path, shown by the arrows traveling parallel to the axis X-X. In some embodiments, a hose 150 is configured to provide water, oil, air, or any other fluid into the venturi assembly 110. In some embodiments, the hose 150 transports an incompressible fluid from a primary fluid source, such as a well (not shown). Primary fluid travels along the primary fluid flow path into the nozzle 112, where the cross-sectional area decreases, causing the velocity of the primary fluid to increase and the static pressure of the fluid to decrease. Primary fluid then enters the throat 114 at a high velocity, and can be further shaped by flow adjusting device 140, which may extend into a portion of throat 114. The low static pressure zone present in the throat 114 is in fluid communication with the conduit 126, which is configured to introduce secondary fluid into the primary fluid flow path along the secondary fluid flow path, which is approximately parallel to the secondary axis Y-Y. When secondary fluid enters the throat 114, the momentum of the primary fluid flowing along the primary fluid flow path causes secondary fluid to be redirected in a direction more aligned with the primary fluid flow path, where it can then exit through the diffuser 116. In some embodiments, the increased area provided by the diffuser 116 creates low pressure zones along the outer walls of the diffuser 116, which may create turbulence in the flow. This may provide for additional mixing between the primary fluid and the secondary fluid. The mixture of primary and secondary fluid may then exit out of the diffuser 116, and therefore exit the venturi assembly 110 altogether. In some embodiments, pipes or hoses (not shown) may be connected to the threaded outlet connection 122 to further define a primary fluid flow path.

The conduit 126 extends away from the throat 114 along the secondary axis Y-Y toward a secondary fluid source connection 130, which may receive a secondary fluid reservoir 128. In some embodiments, the secondary fluid source connection 130 provides a threaded section that can receive a threaded bottle or pipe, which may serve as secondary fluid reservoir 128. A secondary fluid tube 132 can be provided to extend further into the secondary fluid reservoir 128, so that secondary fluid is drawn from the bottom of the secondary fluid reservoir 128 through the secondary fluid tube 132, into the conduit 126, to the throat 114. The secondary fluid tube 132 may be received within a portion of conduit 126, and may also be aligned along the secondary axis Y-Y. In some embodiments, the secondary fluid reservoir 128 comprises a water-based solution. For example, the secondary fluid reservoir 128 may comprise a weed-killing solution, fertilizer solution, bug-killing solution, or other types of solutions desirable to be mixed with water or another primary fluid.

The flow adjusting device 140, which may be situated along the secondary axis Y-Y, can be moved axially along axis Y-Y into and out of throat 114, which affects the cross-sectional area of the primary fluid flow path parallel to axis X-X. As stated previously, the primary axis X-X may be situated substantially perpendicular to the secondary axis Y-Y. The positioning of the flow adjusting device 140 within the throat 114 can determine the rate at which fluid passes along the primary fluid flow path parallel to the primary axis X-X, which in turn determines the rate at which fluid flows along the secondary fluid flow path parallel to the secondary axis Y-Y. Accordingly, a user can adjust the concentration of the secondary fluid within the final mixture of primary and secondary fluids by adjusting the axial position of the flow adjusting device 140 relative to the throat 114.

Figure 3:
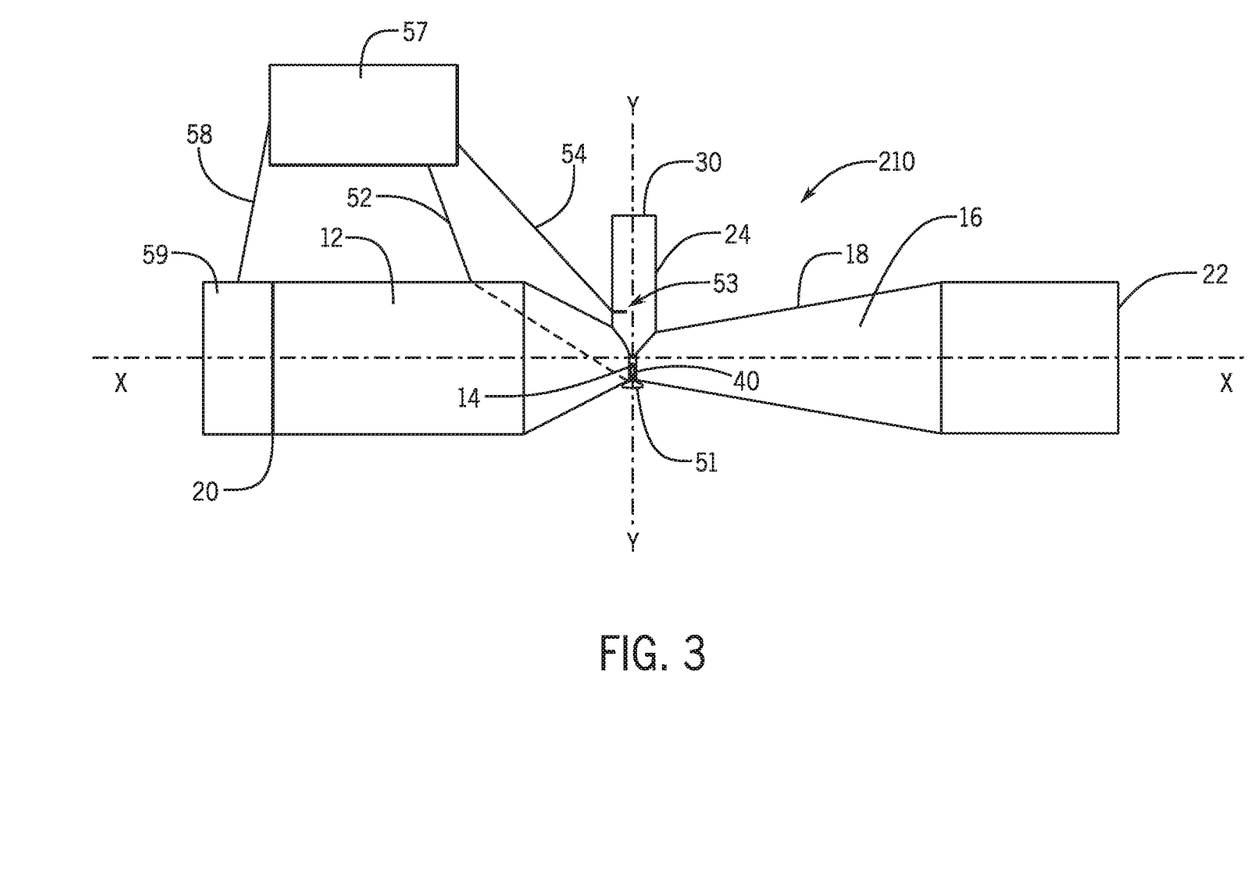
FIG. 3 is a front view of still another embodiment of a venturi assembly according to embodiments of the disclosure.

Referring now to FIG. 3, a third embodiment of a venturi assembly 210 is shown. The venturi assembly 210 is similar to the venturi assembly 10 shown in FIGS. 1A and 1B. However, in the venturi assembly 210, the flow adjusting device 40 is coupled to an actuator 51. In this embodiment, one or more sensors 53 are used to monitor the secondary fluid intake in the secondary fluid inlet 24. A controller 57, such as a central processing unit, is in electrical communication via a line 54 with the sensor 53. The sensor 53 can communicate electrical signals to the controller 57 which indicate the rate at which secondary fluid is entering the primary fluid flow path. The controller 57 may then communicate electrical signals to the actuator 51 via line 52 to move the flow adjusting device 40 axially inward or axially outward along the secondary axis Y-Y to adjust the flow rate of the secondary fluid, so as to maintain a constant or near-constant concentration of primary fluid and secondary fluid throughout the entire operation of the venturi assembly 210. A variable speed pump 59 may supply primary fluid to the nozzle 12 of the venturi assembly 210, and the pump 59 may similarly be in communication via line 58 with the controller 57, such that changes in pump speed may be communicated to the actuator 51, which may adjust accordingly to provide the desired primary fluid and secondary fluid mixture concentration.

The venturi assemblies 10, 110, 210 may comprise a metallic material, such as stainless steel, copper, brass, aluminum, or other metallic material suitable for transporting fluid. In other embodiments, the venturi assemblies 10, 110, 210 may comprise a polymeric material, and can be integrally formed as a single piece, excluding the flow adjusting device 40, 140. For example, the venturi assembly 10, 110, 210 may be formed of a poly-vinyl chloride (PVC) composition. In some embodiments, either of the flow adjusting devices 40, 140 may comprise a different material than the remaining parts within venturi assembly 10, 110, 210. For example, either of the flow adjusting devices 40, 140 may comprise aluminum or stainless steel, while the remaining components of venturi assembly 10, 110, 210 may comprise a thermoplastic material. However, it should be appreciated that many other types of materials can be used to create any of the venturi assemblies 10, 110, 210 and are similarly within the scope of the present disclosure.

Thus, the invention provides an adjustable venturi assembly that can be configured to provide multiple concentrations of primary and secondary fluid mixtures by adjusting a single flow regulation device.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A venturi assembly for injecting a secondary fluid into a primary fluid flow path, the venturi assembly comprising:
    a nozzle;
    a constricted section in fluid communication with the nozzle, the nozzle and constricted section together defining the primary fluid flow path along a first axis;
    a secondary fluid conduit in fluid communication with and extending away from the constricted section along a second axis;
    a flow adjusting device positioned opposite the secondary fluid conduit and along the second axis, the flow adjusting device configured to alter a velocity of fluid flowing along the primary fluid flow path by extending into a portion of the constricted section along the second axis;
    a sensor for monitoring a flow rate of a second fluid flowing along the second axis; and
    a controller in electrical communication with the sensor and an actuator of the flow adjusting device, the controller executing a program stored in the controller to: (i) receive a flow rate signal from the sensor indicative of the flow rate of the second fluid, and (ii) send an actuation signal to the actuator to cause the flow adjusting device to change a cross-sectional area of the constricted section in response to the flow rate signal thereby altering the velocity of fluid flowing along the primary fluid flow path.

2. The venturi assembly of claim 1, wherein the second axis is arranged substantially perpendicular to the first axis.

3. The venturi assembly of claim 2, wherein the flow adjusting device is axially adjustable into and out of the constricted section along the second axis.

4. The venturi assembly of claim 3, wherein the secondary fluid conduit is defined by an interior diameter to transport secondary fluid form a secondary fluid reservoir to the primary fluid flow path and the flow adjusting device is defined by a first diameter larger than the interior diameter.

5. The venturi assembly of claim 4, wherein the flow adjusting device is adjustable between a first position completely outside the constricted section and a second position where the flow adjusting device extends across the constricted section to engage the secondary fluid conduit, restricting outward flow of secondary fluid to the primary fluid flow path.

6. The venturi assembly of claim 1, wherein the constricted section is defined by the cross-sectional area and the flow adjusting device is defined by a frontal area less than the cross-sectional area of the constricted section.

7. The venturi assembly of claim 1, wherein the venturi assembly further comprises a diffuser in fluid communication with the nozzle and constricted section, the diffuser being defined by a tapered section enlarging in cross-sectional area as it extends away from the constricted section.

8. A venturi assembly for mixing at least two liquids, the venturi assembly comprising:
    a nozzle;
    a choked section in fluid communication with the nozzle;
    a diffuser in fluid communication with the choked section, wherein the nozzle, choked section, and diffuser together define a flow path in a first direction along a first axis;
    a secondary liquid source inlet, the secondary liquid source inlet introducing secondary liquid into the choked section in a second direction along a second axis perpendicular to the first axis;
    a flow regulator placed within the choked section, the flow regulator being configured to simultaneously alter fluid flowing in the first direction and fluid flowing in the second direction;
    a sensor for monitoring a flow rate of the secondary liquid into the choked section; and
    a controller in electrical communication with the sensor and an actuator of the flow regulator, the controller executing a program stored in the controller to: (i) receive a flow rate signal from the sensor indicative of the flow rate of the secondary liquid into the choked section, and (ii) send an actuation signal to the actuator to cause the flow regulator to change a cross-sectional area of the choked section in response to the flow rate signal thereby altering the velocity of fluid flowing in the first direction along the first axis.

9. The venturi assembly of claim 8, wherein the flow regulator is a fastener, the fastener being threadably adjustable along the second axis.

10. The venturi assembly of claim 9, wherein a threaded portion of the fastener is centered upon the second axis.

11. The venturi assembly of claim 9, wherein a cylindrical section of the flow regulator is configured to be received within at least a portion of the secondary liquid source inlet.

12. The venturi assembly of claim 8, wherein the secondary source inlet extends away from the choked section toward a secondary liquid reservoir.

13. A venturi assembly for injecting a secondary fluid into a primary fluid flow path, the venturi assembly comprising:
a nozzle;
a throat in fluid communication with the nozzle, the nozzle and the throat together defining the primary fluid flow path;
a secondary fluid conduit in fluid communication with the throat, the secondary fluid conduit for transporting secondary fluid from a secondary fluid reservoir to the throat;
a flow adjusting device configured to alter a velocity of a primary fluid flowing along the primary fluid flow path by changing an inner diameter of the throat;
a sensor for monitoring a flow rate of the secondary fluid from the secondary fluid reservoir to the throat; and
a controller in electrical communication with the sensor and an actuator of the flow adjusting device, the controller executing a program stored in the controller to: (i) receive a flow rate signal from the sensor indicative of the flow rate of the secondary fluid from the secondary fluid reservoir to the throat, and (ii) send an actuation signal to the actuator to cause the flow adjusting device to change the inner diameter of the throat in response to the flow rate signal thereby altering the velocity of fluid flowing along the primary fluid flow path.

14. The venturi assembly of claim 13, wherein the flow adjusting device is positioned outside the throat and configured to alter the velocity of fluid flowing along the primary fluid flow path by collapsing a cross-section of the throat.

15. The venturi assembly of claim 13, wherein the flow adjusting device is positioned opposite the secondary fluid conduit and configured to alter the velocity of fluid flowing along the primary fluid flow path by extending into a portion of the throat.

16. The venturi assembly of claim 13, wherein:
the nozzle and the throat together define the primary fluid flow path along a first axis,
the secondary fluid conduit is configured to transport the secondary fluid from the secondary fluid reservoir to the throat along a second axis, and
the controller executes the program stored in the controller to cause the flow adjusting device to translate along the second axis.

17. The venturi assembly of claim 16, wherein the second axis is arranged substantially perpendicular to the first axis.

18. The venturi assembly of claim 13 wherein:
the controller executes the program stored in the controller to maintain substantially constant concentration of the primary fluid and the secondary fluid during operation of the venturi assembly.

19. The venturi assembly of claim 13, further comprising a pump for supplying the primary fluid to the nozzle.

20. The venturi assembly of claim 19 wherein:
the controller is in electrical communication with the pump, the controller executing the program stored in the controller to: (iii) cause the pump to vary an amount of the primary fluid supplied to the nozzle in response to the flow rate signal received from the sensor.

\* \* \* \* \*